United States Patent [19]

Fukumitsu

[11] Patent Number: 4,479,209
[45] Date of Patent: Oct. 23, 1984

[54] APPARATUS FOR REPRODUCING SIGNALS RECORDED ON A DISK
[75] Inventor: Akira Fukumitsu, Fukaya, Japan
[73] Assignee: Tokyo Shibaura Denki Kabushiki Kaisha, Kawasaki, Japan
[21] Appl. No.: 376,137
[22] Filed: May 7, 1982
[30] Foreign Application Priority Data
  May 9, 1981 [JP] Japan .................................. 56-69829
[51] Int. Cl.³ ...................... G11B 19/00; G11B 23/02
[52] U.S. Cl. .................................. 369/77.2; 369/292
[58] Field of Search ...................... 369/75, 77, 79, 292
[56] References Cited
  U.S. PATENT DOCUMENTS
  4,226,424 10/1980 Gordon .............................. 369/77.2

Primary Examiner—Steven L. Stephan
Attorney, Agent, or Firm—Cushman, Darby & Cushman

[57] ABSTRACT

A video disk player comprises a holding device which holds a retaining frame in a casing for containing a disk and unlocks the same from the casing when the casing containing therein the disk accompanied with the retaining frame is inserted into a housing of the player, thereby leaving the disk and the retaining frame inside the housing when the casing is drawn out of the housing, and releases the retaining frame and locks the same to the casing when the empty casing is inserted into the housing, thereby allowing to take the disk and the retaining frame out of the housing while the disk and the retaining frame are housed in the casing when the casing is drawn out of the housing. The holding device includes a shaft device of a double-shaft structure having first and second shafts.

7 Claims, 23 Drawing Figures

APPARATUS FOR REPRODUCING SIGNALS RECORDED ON A DISK

BACKGROUND OF THE INVENTION

The present invention relates to an apparatus capable of reproducing information recorded on a disk, more specifically to a disk reproduction apparatus comprising means for holding as required therein a disk removably kept in a casing.

Generally, in a disk reproduction apparatus, known as a player, a disk, such as a video disk, is set on a turntable, and a reproducing stylus is put on the video disk to reproduce information recorded on the video disk. This information is composed of video and audio signals, and is recorded with very high density according to a PCM (pulse code modulation) recording system. If any foreign matter, such as dust or dirt, sticks to the video disk, reproduced pictures will be subject to noise. Accordingly, there have been developed various apparatus enabling an operator to set the video disk on or remove the video disk from the turntable without touching the disk.

Meanwhile, the video disk is kept in a protective casing at all times except when being played in the player. A retaining frame surrounding the disk serves to move the disk into and out of the casing when the disk is inserted into and retrieved from the player. The casing is normally locked to the frame when the disk is retained therein. However, the retaining frame is unlocked from the casing when the insertion of the disk is completed. When the casing has been drawn from the reproduction apparatus in this state, both the video disk and the retaining frame remain in the reproduction apparatus so that reproducing operation is ready to start. If the empty casing is inserted into the reproduction apparatus after the reproducing operation has ended, the video disk, is again retained in the casing with the retaining frame. The retaining frame is relocked to the casing so that the casing which loads the video disk and the retaining frame can be taken out of the apparatus.

In order to accomplish the aforementioned operation, it is necessary to provide holding means which unlocks the retaining frame from the casing and holds the retaining frame when the casing containing the video disk is inserted into the reproduction apparatus, and releases its hold of the retaining frame and locks the same to the casing when the empty casing is inserted into the reproduction apparatus after the completion of the reproducing operation. Although conventionally available, such holding means is complicated in construction, and requires too many components. In many cases, moreover, such conventional holding means is not smooth in operation or is subject to wrong operation.

SUMMARY OF THE INVENTION

The present invention is contrived in consideration of above mentioned circumstances, and is intended to provide an apparatus for reproducing signals recorded on a disk, provided with holding means of error-free, simplified construction capable of smooth insertion of a casing without requiring any substantial force and secure locking of a retaining frame.

According to an aspect of the present invention, there is provided an apparatus for reproducing signals recorded on a disk which is kept in a casing at all times except when being played therein, the disk being surrounded by a retaining frame which serves to move the disk into and out of the casing when the disk is inserted into and drawn from the apparatus, said casing providing lock means for locking the retaining frame thereto, said lock means including a stop notches formed on each of both inner side faces of the casing, and a strip formed on each of both outer side faces of the retaining frame and having a claw in a position to engage each said stop notch corresponding thereto, said claw being capable of being disengaged from its corresponding stop notch, said apparatus comprising:

a housing; and holding means for holding the retaining frame and unlocking the same from the casing when the casing is inserted into said housing, said holding means including:

a first shaft rotatably disposed inside said housing at right angles to said inserting direction and having a coaxially pierced hollow portion;

a second shaft inserted in said first shaft, having both end portions projected outward severally from both end portions of the first shaft, and pivotally mounted to said housing to be rotatable independently of the first shaft;

first and second latch members fixed to both ends of said first shaft respectively, extending along said inserting direction, and capable of rocking integrally about the first shaft between a first position where the latch members engage the lower portion of the retaining frame when the casing loading the retaining frame and the disk is inserted, a second position where the latch members hold the retaining frame when the casing is drawn out, and a third position where the latch members do not hold the retaining frame when the unloaded casing is inserted;

first and second cancel members spatially fixed to the second shaft to adjoin the latch members respectively, extending along said inserting direction, and each having an engaging portion capable of engaging the top surface of each adjacent latch member, said cancel members being capable of rocking integrally about the second shaft between a fourth position where the cancel members engage the elastic strips of the retaining frame in the casing being inserted, thereby unlocking the retaining frame from the casing, a fifth position where each said engaging portion engages the top surface of its corresponding latch member as the casing is drawn out, and where the extended ends of the cancel members are allowed to engage the lower portion of the unloaded casing being inserted, and a sixth position where the top surfaces of the cancel members on the proximal end side thereof engage the lower portion of the inserted empty casing, said latch members being rocked from said second position to said third position through the engagement between the engaging portions and the latch members as the cancel members rock from said fifth position to said sixth position; and urging means for urging at least one of said latch members to rock from said third position to said first position.

DETAILED DESCRIPTION OF THE PREFERRED EMBODIMENT

There will now be described in detail one embodiment of an apparatus for reproducing signals recorded on a disk according to the present invention with reference to the accompanying drawings.

Figure 1:
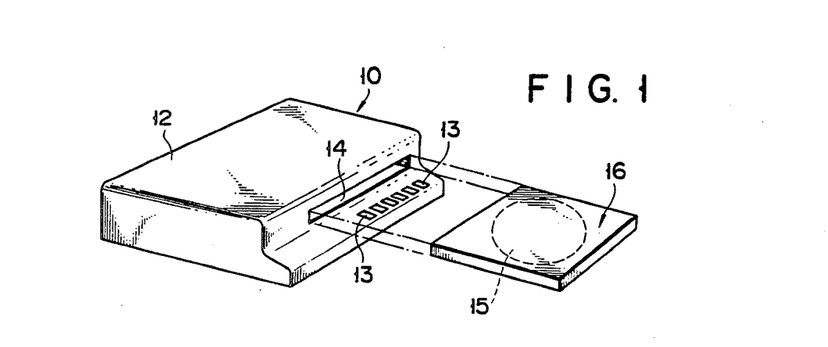
FIG. 1 is a perspective view showing one embodiment of an apparatus for reproducing signals recorded on a disk according to the present invention.

In this embodiment, as shown in FIG. 1, the reproduction apparatus is a video disk player 10 provided with a housing 12. Arranged on the top surface of the housing 12 are plurality of operating buttons 13 for designating various operation modes. On the front side face of the housing 12 opens a horizontally extending insertion slot 14 in which a casing 16 is inserted. The housing 12 contains therein a reproducing mechanism (not shown) for reproducing information recorded on a video disk 15.

In a non-reproduction mode, the video disk 15, and a retaining frame 17, are contained in the casing 16. In this mode, the video disk 15 is not exposed to the outside, and hence is kept from being soiled by direct touch of fingers.

Figure 2:
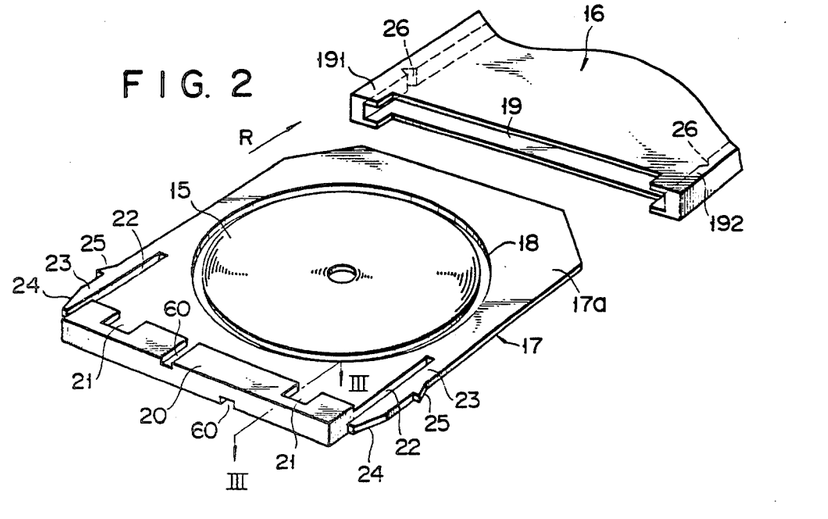
FIG. 2 is a perspective view showing a video disk used in the apparatus shown in FIG. 1, along with a retaining frame retaining the video disk and a casing to house the video disk and the retaining frame.

As shown in FIG. 2, the video disk 15 is disposed in a through hole 18 which is a size larger than the video disk 15 and is formed in the central portion of the retaining frame 17. Thus, the video disk 15 with the retaining frame 17 is allowed to move in the horizontal direction, however, the movement of the disk 18 toward the vertical direction is independently free of the retaining frame 17. The casing 16 is in the form of a thin box having an opening 19 in one side face through which the video disk 15 is inserted together with the retaining frame 17 in a direction shown by an arrow R, and defining therein a space to contain the video disk 15 with the retaining frame 17.

Figure 3:
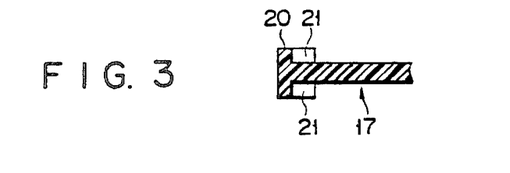
FIG. 3 is a sectional view taken along line III—III of FIG. 2.

The retaining frame 17 includes a frame body 17a which is a little thicker than the video disk 15 and a little thinner than the height of the opening 19 of the casing 16, and which has the through hole 18 in the center thereof, and a bank portion 20 formed on that side of the frame body 17a which extends at right angles to the inserting direction R and having a thickness substantially equal to the height of the casing 16. Recesses 21 are formed severally at both end portions of the bank portion 20. The bottom of each recess 21 is flush with the top surface of the frame body 17a. As shown in FIG. 3, the recesses 21 are formed on both top and bottom sides of the bank portion 20. Slits 22 are formed on both sides of the frame body 17a of the retaining frame 17, each of which extends towards the direction R at a given length from one end of the frame body 17a. The pair of slits 22 define a pair of elastic strips 23 extending in the inserting direction R on both sides of the frame body 17a. An outwardly projecting claw 25 is formed in the middle of each elastic strip 23. The claw 25 is composed of a stop surface at right angles to the inserting direction R and a pressing surface inclined inwardly in the inserting direction R. The outer side face of the tip end portion of each elastic strip 23 is composed of a slant face 24 inclined inwardly in the opposite direction to the inserting direction R.

Stop notches 26 capable of receiving their corresponding claws 25 of the retaining frame 17 are formed on those portions of the inner side faces of the casing 16 defining the inside space thereof which face the claws 25 with the retaining frame 17 entirely housed in the casing 16. While the video disk 15 is surrounded by the retaining frame 17, both these members are inserted through the opening 19 into the casing 16 with the other end portion of the retaining frame 17 forward. When both claws 25 abut against the edges of the opening 19 of the casing 16 in the middle of the insertion, both elastic strips 23 are pushed inward through the engagement between the pressing surfaces of the claws 25 and the edges, and the retaining frame 17, accompanied with the video disk 15, is inserted deep into the casing 16. When the retaining frame 17 is entirely swallowed up by the casing 16, both claws 25 are urged to get into their corresponding stop notches 26 of the casing 16 by the elasticity of the elastic strips 23, thereby locking the retaining frame 17 to the casing 16. In such a locked state, the bank portion 20 completely blocks up the opening 19 of the casing 16, thus keeping dust from penetrating into the casing 16 to soil the video disk 15. Since the retaining frame 17 is locked to the casing 16 through the engagement between the claws 25 and the stop notches 26, you will never be able to pull out the video disk 15 from the casing 16 with your hand on the bank portion 20.

Figure 4:
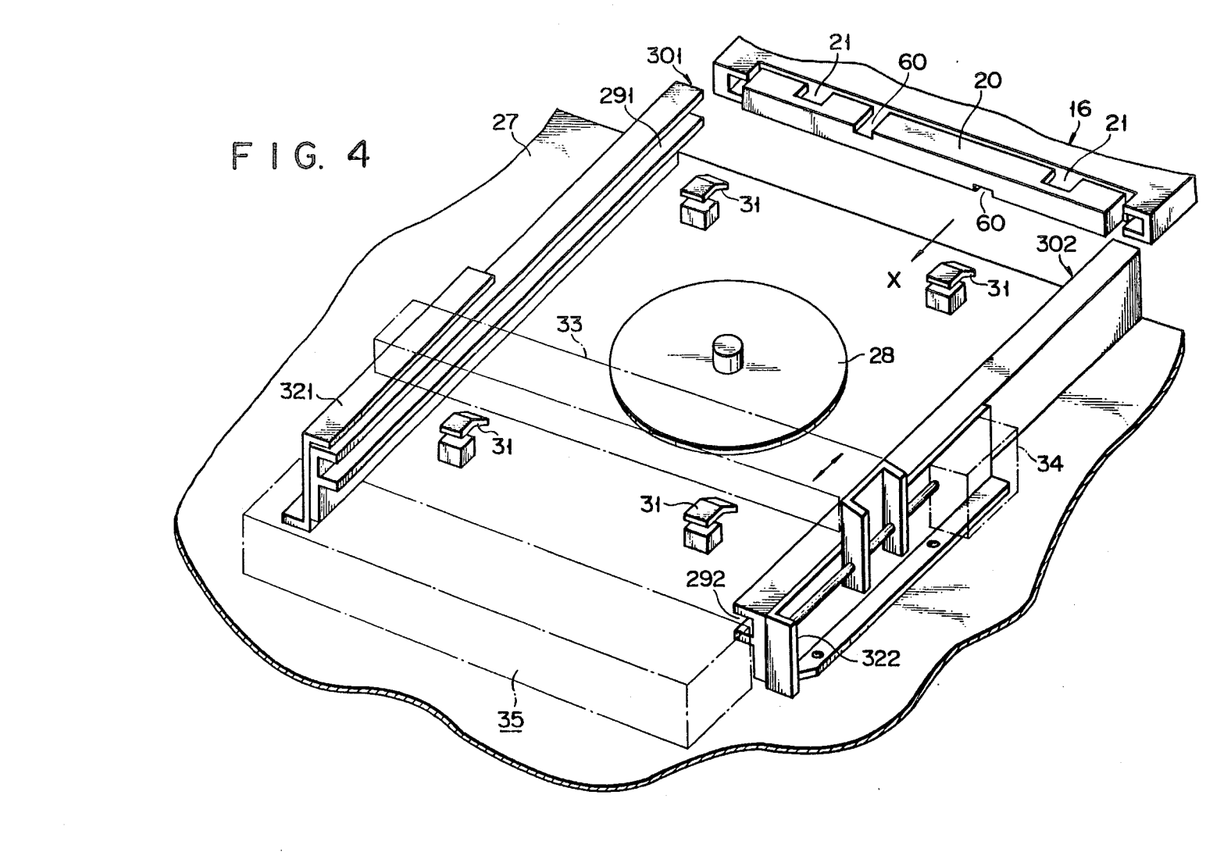
FIG. 4 is a perspective view schematically showing the internal structure of the apparatus of FIG. 1.

Referring now to FIG. 4, there will be described a guide mechanism for the casing 16 inside the player 10.

As shown in FIG. 4, a horizontally extending chassis 27 is disposed in the housing 12 of the player 10. A turntable 28 with a diameter smaller than that of the video disk 15 is mounted on the chassis 27, which is also moved vertically by a driving mechanism (not shown). A pair of guide rails 301 and 302 are fixed on the chassis 27, extending parallel to an inserting direction indicated by an arrow X (opposite to the aforesaid inserting direction R) and facing each other with the turntable 28 between them. One end of each of the guide rails 301 and 302 is located at each corresponding end portion of the inserting slot 14 shown in FIG. 1. The guide rails 301 and 302 are each provided with groove portions 291 and 292, respectively, to receive their corresponding side portions of the casing 16, the groove portions being a given distance above the top surface of the chassis 27. The guide rails 301 and 302 are long enough to allow the retaining frame 17 to be entirely swallowed up by the housing 12.

The guide rails 301 and 302 are attached to the chassis 27 by means of a pair of auxiliary chassis 321 and 322, respectively. A pickup arm 33 is stretched between the two auxiliary chassis 321 and 322, extending at right angles to the direction of the arrow X. The pickup arm 33 is allowed to move along the direction of the arrow X. One auxiliary chassis 322 is fitted with a driving mechanism 34 (shown only briefly) for driving the pickup arm 33. The pickup arm 33 is fitted with a reproducing stylus (not shown), which contacts a groove on the video disk 15 set on the turntable 28 to pick up audio/video signals recorded on the video disk 15.

Four support members 31 are arranged on the region of the chassis 27 around the turntable 28. These support members 31 support the inner peripheral edge of the frame body 17a and the outer peripheral portion of the video disk 15 while the video disk 15 is entirely contained in the housing 12. In the non-operating state, the top surface of the turntable 28 is located below the top surfaces of the support members 31. The top surfaces of the support member 31 are substantially flush with the under surfaces of the groove portions 291 and 292 of the guide rails 301 and 302.

Disposed on that portion of the chassis 27 which faces the other end portions of the guide rails 301 and 302 is a holding device 35 (described in detail later) to hold the bank portion 20 of the retaining frame 17 as required. The holding device 35 so functions as to unlock the retaining frame 17 from the casing 16 and hold the same when the casing 16, containing therein the video disk 15 surrounded by the retaining frame 17, is inserted in the housing 12, and to release the hold of the retaining frame 17 and lock the same to the casing 16 when the empty casing 16 is inserted in the housing 12 containing the video disk 15 therein after the reproducing operation is ended.

Figure 5A:
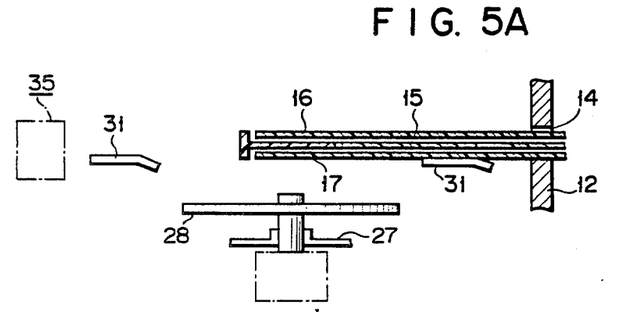
FIGS. 5A to 5C are side views schematically illustrating the operation of a turntable used in the apparatus of FIG. 1.
Figure 5B:
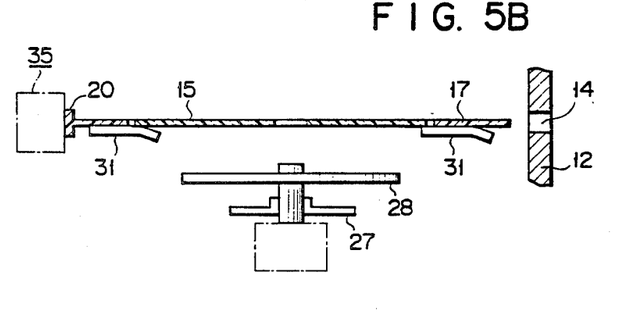
Figure 5C:
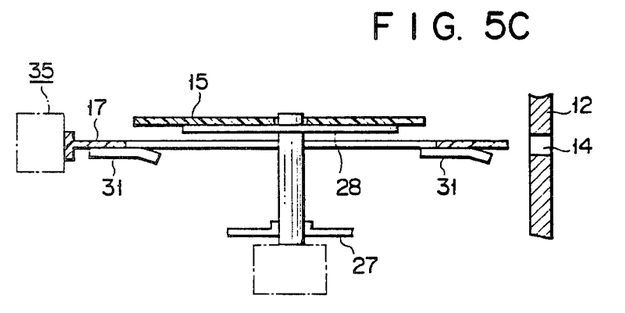

Referring now to FIGS. 5A to 5C, there will be described the way of inserting the video disk 15.

First, the video disk 15 with the retaining frame 17, is set in the casing 16, and the casing 16 is inserted through the insertion slot 14 into the housing 12 with its one end portion forward while the retaining frame 17 is locked to the casing 16. Both side portions of the casing 16 are regulated and guided in inward movement by the respective groove portions 291 and 292 of the guide rails 301 and 302. At this time, the under surface of the casing 16 is supported on the top surfaces of the four support members 31, and the turntable 28 is located below the support members 31, as shown in FIG. 5A, so that the casing 16 can be inserted without hindrance.

If the casing 16 is further pushed in from the position shown in FIG. 5A, the one end portion of the casing 16 abuts against the holding device 35. By the agency of the holding device 35, the bank portion 20 of the retaining frame 17 is stopped, and the casing 16 and the retaining frame 17 are unlocked or disengaged from each other. If the casing 16, in this state, is pulled out, the retaining frame 17, held by the holding device 35, remains within the housing 12, accompanied with the video disk 15, while the casing 16 is emptied and taken out of the housing 12. Accordingly, the retaining frame 17 and the video disk 15 are supported by the four support members 31, as shown in FIG. 5B.

In the state shown in FIG. 5B, if one of the operating buttons 13 is depressed to give instructions for the start of reproducing operation, the turntable 28 first ascends to bear the video disk 15 thereon, and further rises to elevate the disk 15. Thus, the video disk 15 is brought to the position higher than the support members 31, and released from the support thereby, as shown in FIG. 5C. In the state of FIG. 5C, the turntable 28 rotates, the pickup arm 33 moves to a predetermined position, and audio/video signals are picked up from the video disk 15 by the reproducing stylus.

When the reproducing operation is completed, the pickup arm 33 returns to its original position, and the turntable 28 ceases to rotate. Then, the turntable 28 descends to the position shown in FIG. 5B, and the video disk 15 comes to be supported by the support members 31. If, in this state, the empty casing 16 is inserted through the insertion slot 14 into the housing 12 with its one end portion (at which the opening 19 is formed) forward until the one end portion of the casing 16 abuts against the bank portion 20 of the retaining frame 17, then the retaining frame 17 is locked to the casing 16, and the holding device 35 releases its hold of the retaining frame 17. If the casing 16 is pulled out, therefore, the video disk 15 is taken out of the housing 12 while it is housed together with the retaining frame 17 in the casing 16, as shown in FIG. 5A.

Even though the turntable 28 moves up and down, driving force can securely be transmitted to the turntable 28 by means of a belt (not shown).

Figure 7:
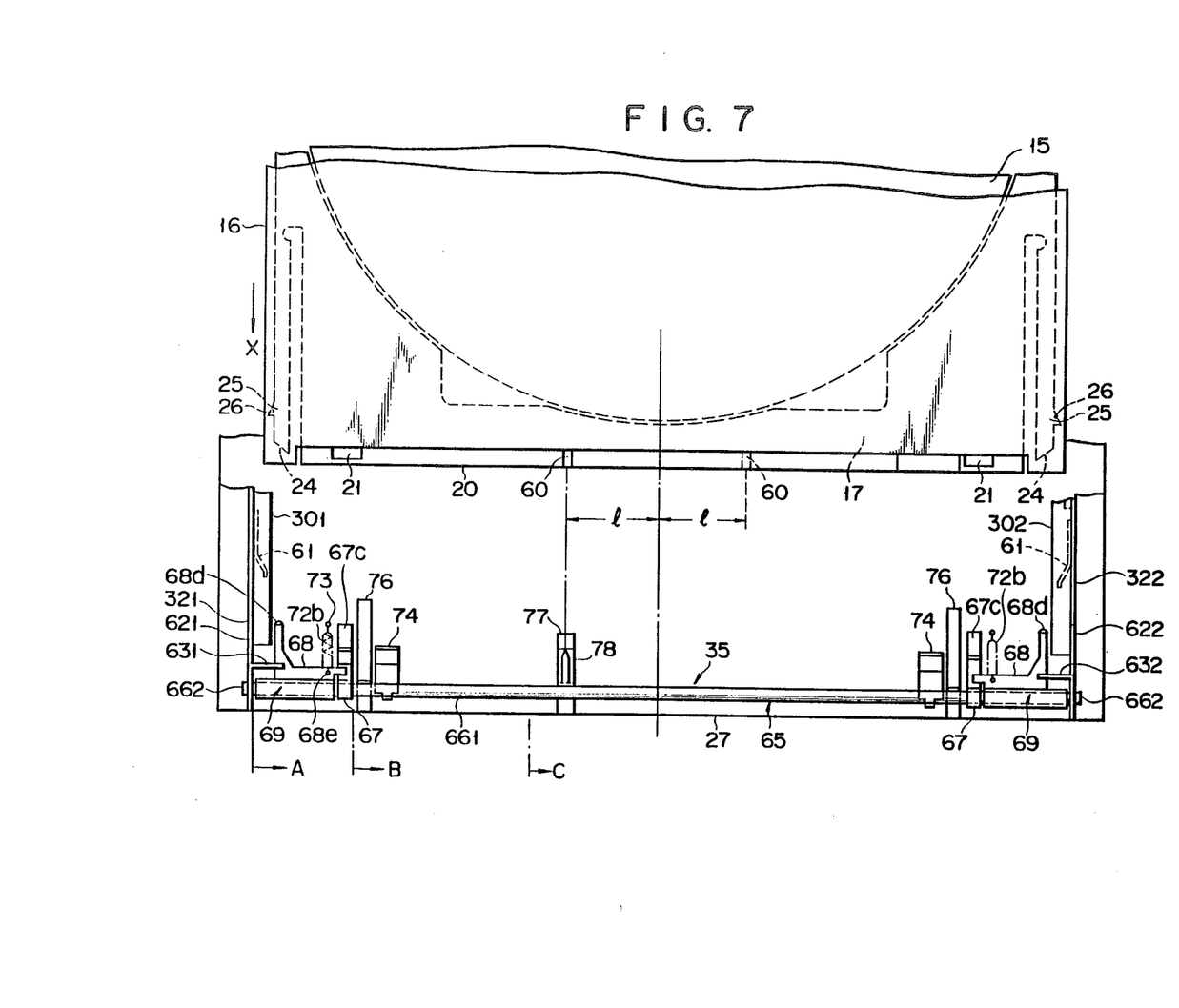
FIG. 7 is a top plan view showing the details of the holding device of FIG. 4.

Formed respectively in the upper and lower surfaces of the bank portion 20 of the retaining frame 17, as shown in FIG. 2, are guide grooves 60 which extend along the inserting direction indicated by the arrow X. As shown in FIG. 7, each guide groove 60 is at a given distance 1 from the center of the bank portion 20.

Referring now to FIGS. 6 to 18, there will be described the holding device 35 which constitutes the most characteristic feature of the present invention.

Figure 6:
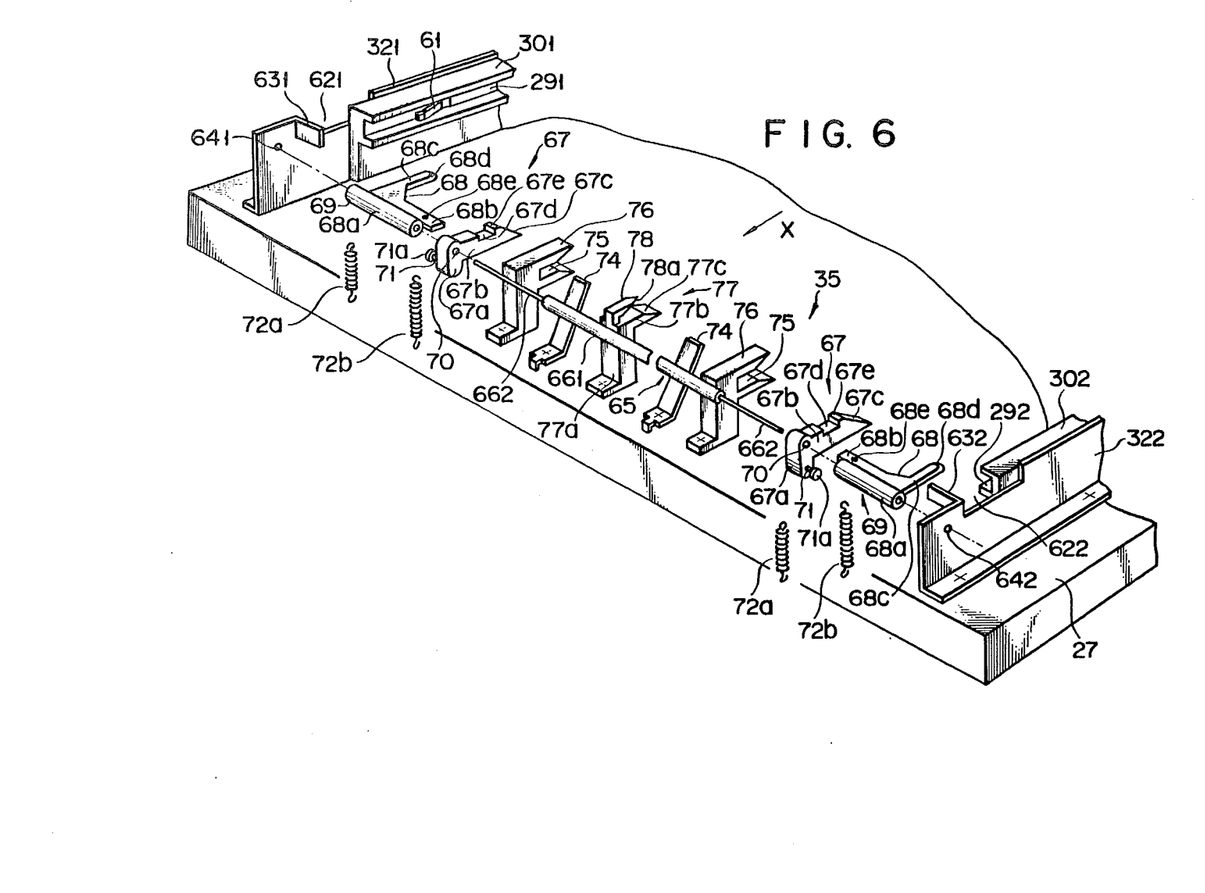
FIG. 6 is a disassembled perspective view of a holding device shown in FIG. 4.
Figure 8:
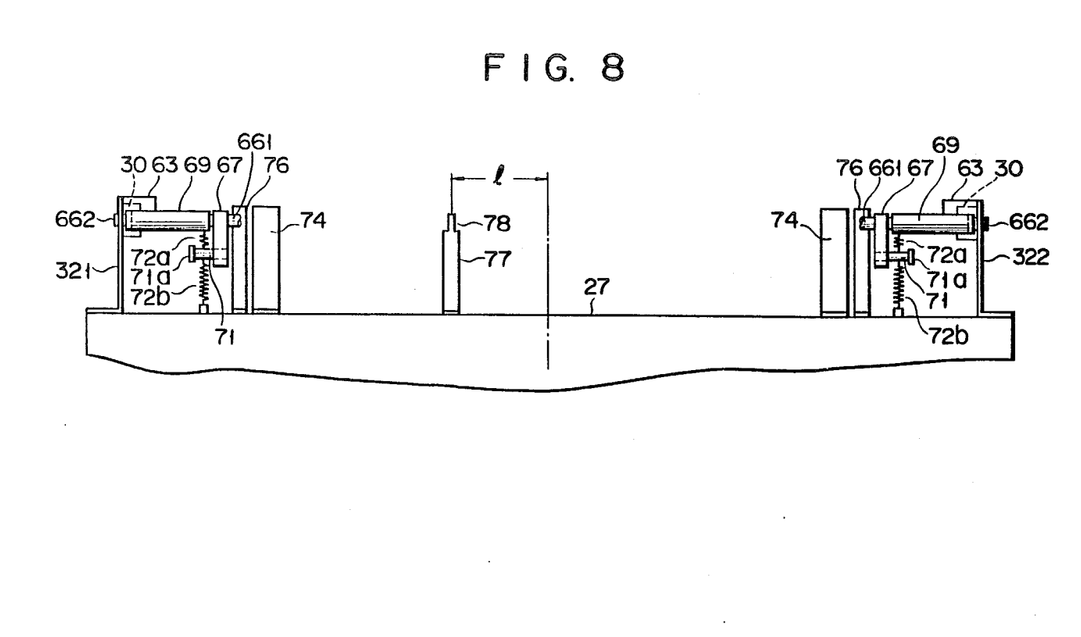
FIG. 8 is a front view showing the details of the holding device of FIG. 4.
Figure 9:
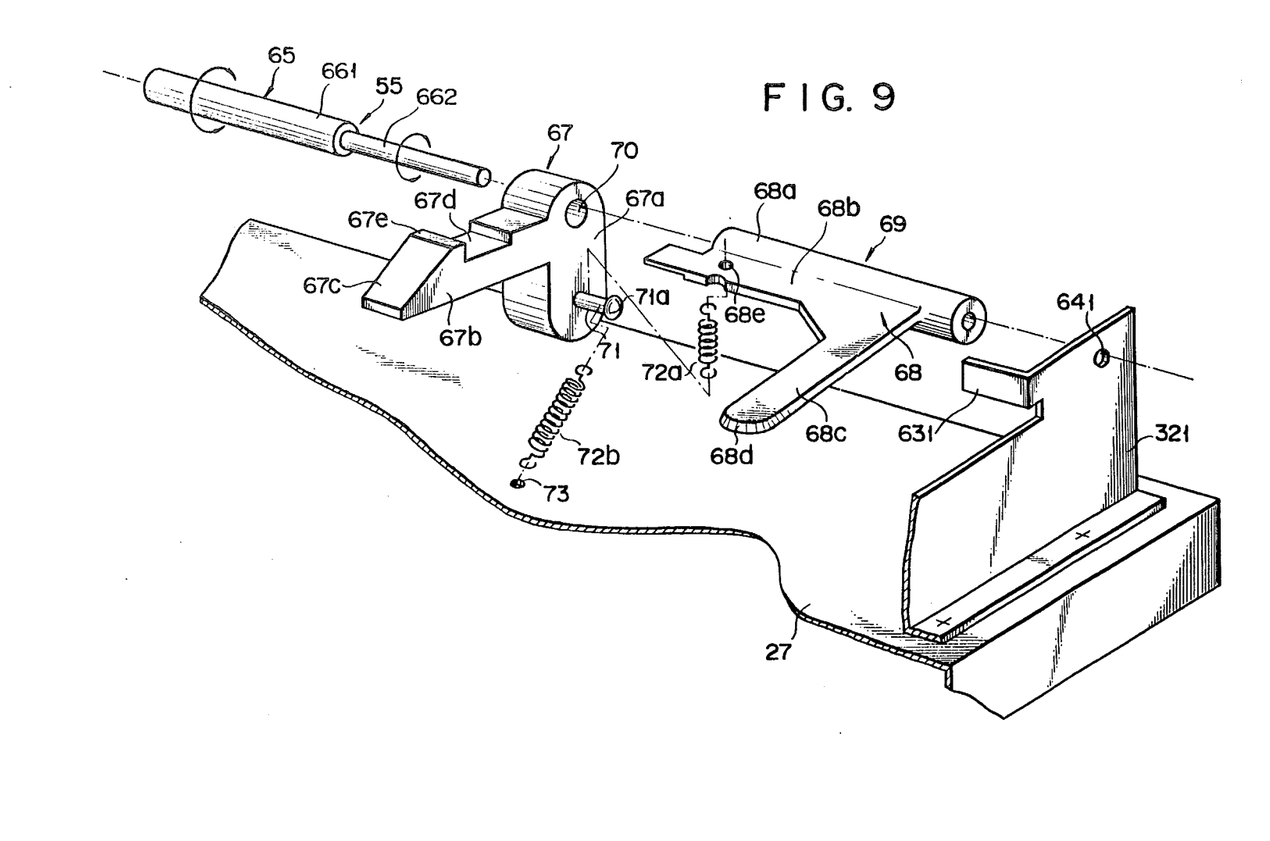
FIG. 9 is a disassembled perspective view enlargedly showing the principal part of the holding device shown in FIG. 6.
Figure 10:
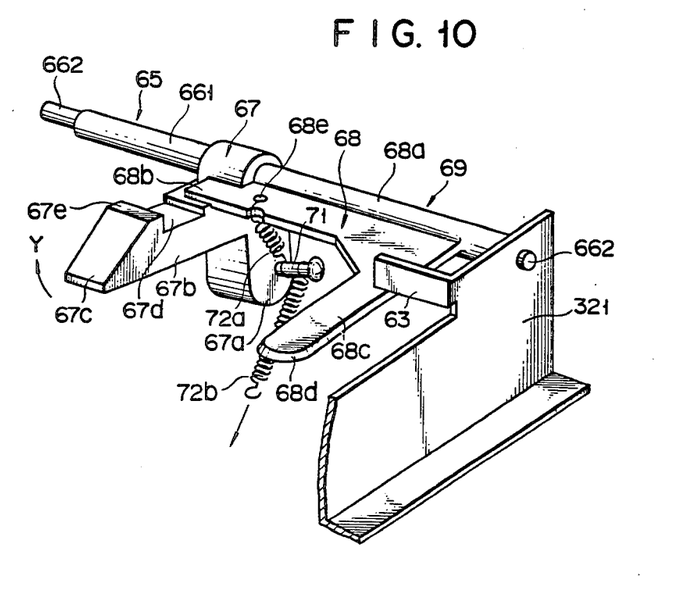
FIG. 10 is an assembled view corresponding to FIG. 8.

The holding device 35 is illustrated by the disassembled perspective view of FIG. 6, assembled plan view of FIG. 7 showing a state before the retaining frame 17 is held, front view of FIG. 8 corresponding to FIG. 7, and disassembled perspective view of FIG. 9 in which the principal part shown in FIG. 6 is enlarged. FIG. 10 is an assembled perspective view corresponding to FIG. 9.

As shown in FIG. 6, a pair of spring strips 61 are provided severally on the side faces of the groove portions 291 and 292 of the guide rails 301 and 302. The spring strips 61 inwardly urge both side faces of the casing 16 guided in insertion by the guide rails 301 and 302 lest the casing 16 should slide crosswise. Namely, the spring strips 61 are intended to define roughly the transverse position of the casing 16 so that the guide grooves 60 of the retaining frame 17 may be located in predetermined positions relative to the chassis 27 when the casing 16 is inserted.

Notches 621 and 622 are formed in those portions of the auxiliary chassis 321 and 322 where the forward end portions of the guide rails 301 and 302 are located. Strips 631 and 632 cut out for the formation of the notches 621 and 622 are bent inwardly from the auxiliary chassis 321 and 322, respectively. The strips 631 and 632 function as stoppers to regulate the insertion of the casing 16 by receiving the casing 16 on the front, and also to regulate the rocking of release strips 68 (mentioned later) by receiving the release strips 68 on the bottom. Insertion holes 641 and 642 are formed in those portions of the auxiliary chassis 321 and 322, respectively, which lie ahead of the strips 631 and 632 in the inserting direction X. A shaft device 65 is rotatably mounted on the auxiliary chassis 321 and 322 with the aid of the insertion holes 641 and 642.

The shaft device 65 has a double-shaft structure, including first and second shafts 661 and 662. The first shaft 661 is in the form of a hollow cylinder which has a length shorter than the distance between the two auxiliary chassis 321 and 322. The second shaft 662, on the other hand, is in the form of a solid cylinder which has a length greater than the distance between both auxiliary chassis 321 and 322 and a diameter great enough to allow the second shaft 662 to be loosely passed through the first shaft 661. The second shaft 662 is rotatably inserted in the first shaft 661, and both ends of the second shaft 662 project outward from their corresponding ends of the first shaft 661. The projected ends of the second shaft 662 are inserted in the insertion holes 641 and 642 so that the shaft device 65 is supported rotatably.

Latch members 67 are fixed to both end portions of the first shaft 661, respectively. Also, as shown in FIG. 9, each latch member 67 has a substantially T-shaped profile. Namely, the latch member 67 includes a vertically extending first portion 67a, and a second portion 67b extending from the middle of the first portion 67a in the opposite direction to the inserting direction X. Bored through the upper end of the first portion 67a is a hole 70 into which the first shaft 661 is inserted. A pin 71 protrudes from that side face of the lower end of the first portion 67a which faces its corresponding auxiliary chassis 321 or 322. A flange 71a is formed at the distal end of the pin 71. A slant face 67c is formed at the tip end of the second portion 67b. The slant face 67c is so inclined that the forward end of the retaining frame 17 may cause the latch member 67 to rock in the clockwise direction of FIG. 6 when it abuts against the slant face 78c in the inserting direction X. A recess 67d is formed in the top surface of the second portion 67b. A projection 67e, formed at the distal end portion of the top surface of the second portion 67b between the recess 67d and the upper end of the slant face 67c, functions as a claw portion. Constructed in this manner, the latch members 67 rotate independently of the second shaft 662 as the first shaft 661 rotates. In other words, when one of the latch members 67 rotates, the other also rotates through the first shaft 661.

Cancelers 69 are fixed to both end portions of the second shaft 662, respectively. Each canceler 69 includes a release strip 68 with a substantially L-shaped plane configuration, and a shaft portion 68a through which the second shaft 662 is passed, the release strip 68 and the shaft portion 68a being formed integrally with each other. The release strip 68 is composed of a third portion 68b extending along the second shaft 662 and protruding beyond the shaft portion 68a toward the latch member 67, and a fourth portion 68c extending in the opposite direction to the inserting direction X from that end portion of the third portion 68b which faces its corresponding auxiliary chassis 321 or 322. Formed at the distal end of the fourth portion 68c is a slant face 68d similar to the aforesaid slant face 67c. A hole 68e is bored through one end of the third portion 68b. The projected end of the third portion 68b is allowed to engage the top surface of the second portion 67b of its corresponding latch member 67. The top surface of the fourth portion 68c is allowed to engage the under surface of its corresponding strip 631 or 632. Constructed in this manner, the two cancelers 69 rotate independently of the first shaft 661 as the second shaft 662 rotates. In other words, when one of the cancelers 69 rotates, the other also rotates through the second shaft 662.

A first spring 72a is stretched between the hole 68e of each release strip 68 and the pin 71 of its corresponding latch member 67. The first spring 72a urges the canceler 69 and the latch member 67 to pull each other. In other words, the projected end of the third portion 68b of the canceler 69 is pressed against the top surface of the second portion 67b of the latch member 67 by the first spring 72a.

Figure 11:
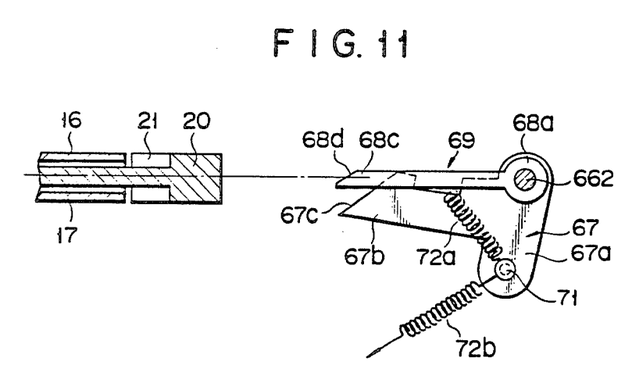
FIG. 11 is a side view showing the state of assembly shown in FIG. 10.

Likewise, a second spring 72b is stretched between each pin 71 and a corresponding hole formed on the chassis 72. The second spring 72b urges the latch member 67 to rock in the counterclockwise direction of FIG. 6, that is, in the direction of an arrow Y in FIG. 10. Thus, the fourth portion 68c of the canceler 69 is rocked by the second spring 72b until it abuts against the strip 631 or 632 of its corresponding auxiliary chassis 321 or 322. In contact with the strips 631 and 632, respectively, the respective fourth portions 68c of the release strips 68 are allowed to be inserted into projected portions 191 and 192 of the casing 16 being inserted, as shown in FIG. 11. Further, the slant faces 67c formed at the tip ends of the respective second portions 67b of the latch members 67 are allowed to engage those portions of the lower edge of the bank portion 20 of the retaining frame 17 where the recesses 21 are formed.

Thus, when the canceler 69 is rotated in the opposite direction to the direction of the arrow Y of FIG. 10, the latch members 67, fitted with the first and second springs 72a and 72b, is also rotated in the same direction. When the latch member 67 is rotated in the opposite direction of the arrow Y, the canceler 69 is also rocked in the same direction if it is not stopped by the casing 16, but cannot be rocked if it is arrested by the casing 16. In the latter case, the latch member 67 is disengaged from the canceler 69 and rotates singly, while the canceler 69 stays where it is.

As shown again in FIG. 6, a pair of elastic strips 74 are disposed on the chassis 27 at those portions thereof which are a little nearer to the casing insertion slot 14 than the shaft device 65 is. Each elastic strip 74 is formed by bending a rectangular leaf spring in the middle, and is slantly fixed on the chassis 27. The upper ends of the elastic strips 74 are located a little higher than the shaft device 65. The number of the elastic strips 74 need not always be two, and may be more. Preferably, however, the elastic strips 74 should be two in number. The elastic strips 74 function as buffer members to absorb a shock caused at the insertion of the casing 16. Moreover, the elastic strips 74 have a function to provide a force for the removal of the casing 16. Thus, the use of the elastic strips 74 facilitates the operation to take out the disk 15 with the retaining frame 17 from the housing 12 by inserting the empty casing 16 into the housing 12.

Figure 12:
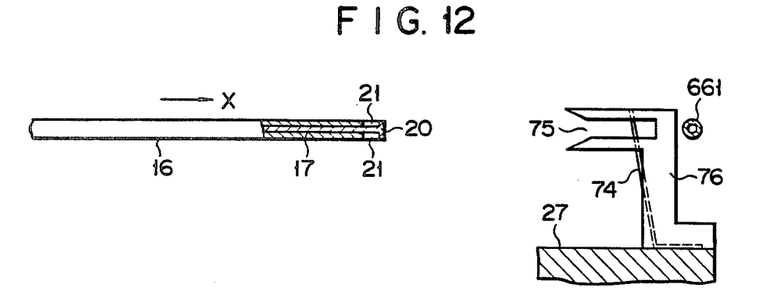
FIG. 12 is a side sectional view taken along the direction of an arrow B of FIG. 7.

Each of two vertical guide member 76 is disposed on that portion of the chassis 27 between each elastic strip 74 and adjacent latch member 67. Each longitudinal guide member 76 has a substantially F-shaped profile, and includes a fitting slot 75 opening toward the insertion slot 14. The fitting slot 75 is located at the same height as the guide grooves 291 and 292 of the guide rails 301 and 302. Thus, the retaining frame 17 inside the casing 16 inserted with the aid of the guide rails 301 and 302 is fitted in the fitting slots 75 to be regulated in its vertical position. Namely, the height of the retaining frame 17 is fixed. As shown in FIG. 12, the upper end portions of the aforementioned elastic strips 74 are located within each fitting slot 75, as viewed from the flank. Namely, the elastic strips 74 perform their buffer actions when the retaining frame 17 is inserted in the fitting slots 75 of the vertical guide members 76.

Figure 13:
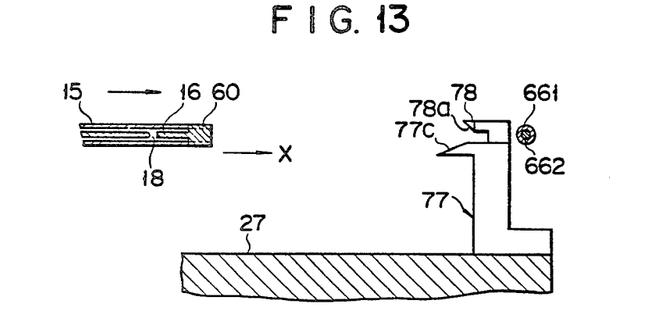
FIG. 13 is a side sectional view taken along the direction of an arrow C of FIG. 7.

A transverse guide member 77 is mounted on the chassis 27 at that portion thereof between the two elastic strips 74 and deviated at a distance l from the center. The transverse guide member 77 has a substantially inverted L-shaped profile, and includes a fifth portion 77a standing upright on the chassis 27 and a sixth portion 77b extending from the upper end of the fifth portion 77a toward the insertion slot 14. Formed at the distal end of the sixth portion 77b is a slant face 77c similar to the slant face 67c of the latch member 67. Integrally formed on the top of the sixth portion 77b, as shown in FIG. 13, is a pin 78 which, extending parallel to the sixth portion 77b at a distance therefrom, can be inserted into that one of the guide grooves 60 which is formed on the upper side of the retaining frame 17. When the pin 78 is inserted in the guide groove 60 in the bank portion 20 of the retaining frame 17 housed in the casing 16 being inserted, the transverse position of the retaining frame 17 is regulated exactly. A taper surface 78a is formed at the distal end portion of the pin 78 so that the pin 78 may easily be inserted into the guide groove 60. If the disk 15 is inserted upside down for the reproduction of signals recorded on the reverse side of the disk 15, then the other guide groove 60 which is located on the under side of the retaining frame 17 in FIG. 2 comes to appear on the upper side, and thus the transverse position of the retaining frame 17 can be exactly regulated in the same manner. Since the pin 78 is previously roughly aligned with the guide groove 60 by the spring strips 61, it is not feared that the pin 78 should abut against the front of the bank portion 20 without being inserted into the guide groove 60.

There will now be described the operation of the holding device 35 thus constructed.

Figure 14:
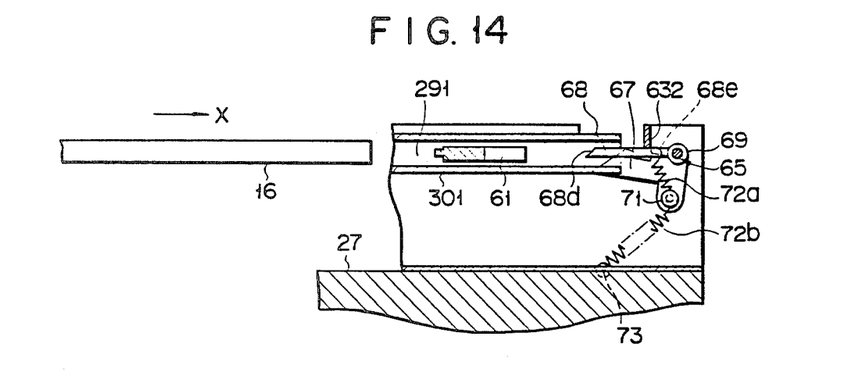
FIG. 14 is a side sectional view taken along the direction of an arrow A of FIG. 7.

First, the casing 16 containing therein the disk 15 with the retaining frame 17 is inserted through the casing insertion slot 14 along the respective groove portions 291 and 292 of the pair of guide rails 301 and 302. The inserted casing 16, as shown in FIG. 14, is roughly corrected in transverse position by the spring strips 61 inside the groove portions 291 and 292. Then, the forward end of the retaining frame 17, as shown in FIG. 12, is fitted into the respective fitting slots 75 of the vertical guide members 76 to regulate the vertical position of the retaining frame 17. When fitted in the fitting grooves 75 of the vertical guide members 76, the retaining frame 17 in the casing 16 abuts against the elastic strips 74 to be buffed thereby in abutting force. When the forward end of the casing 16 abuts against the strips 631 and 632, the insertion of the casing 16 is stopped.

Figure 15:
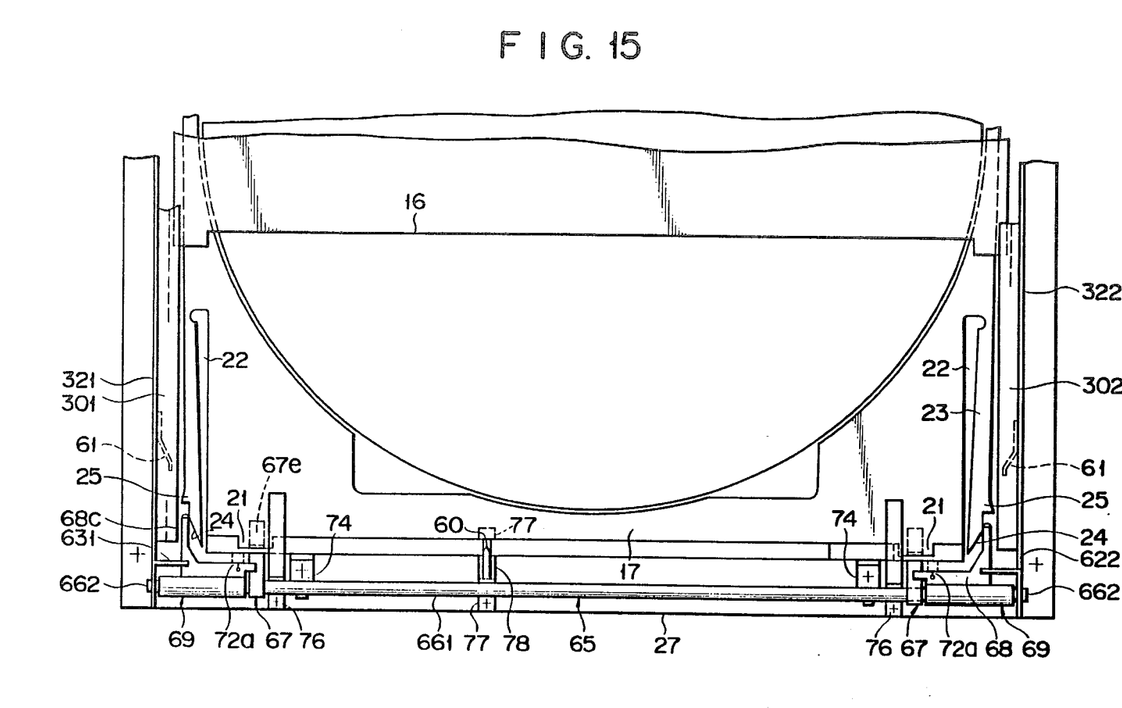
FIG. 15 is a plan view showing a state in which the retaining frame is held by the holding device and unlocked from the casing.

When the insertion is ended, the distal end portions of the fourth portions 68c of the respective release strips 68 of the cancelers 69, as shown in FIG. 15, penetrate into their corresponding projected portions 191 and 192 of the casing 16, and abut against the respective slant faces 24 of the elastic strips 23. Accordingly, the elastic strips 23 are pressed inwardly by the slant faces 24 to reduce the width of the slits 22. Thus, the claws 25 are disengaged from the stop notches 26 of the casing 16. Namely, the retaining frame 17 is unlocked from the casing 16.

Figure 16A:
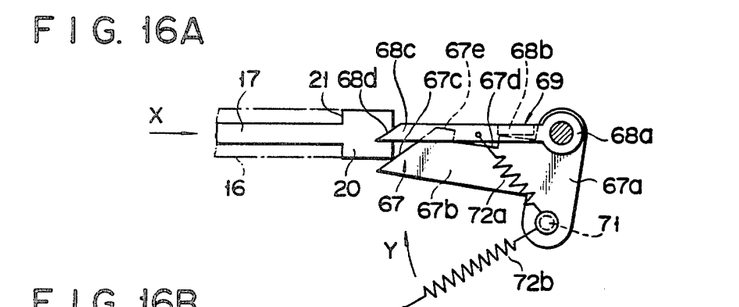
FIGS. 16A to 16D are side views for illustrating several processes of holding operation.
Figure 16B:
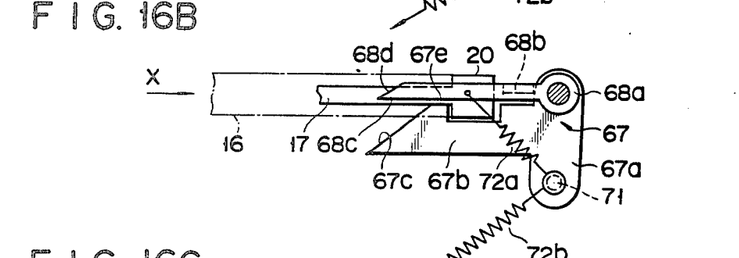

At the same time with the unlocking action, the bank portion 20 of the retaining frame 17 engages the respective slant faces 67c of the latch members 67, as shown in FIG. 16A, to rotate the latch members 67 in the opposite direction to the direction of the arrow Y along the slant faces 67c, against the urging force of the second springs 72b. Since the fourth portions of the cancelers 69 are inserted severally into the projected portions 191 and 192 of the casing 16, the respective second portions 67b of the latch members 67 are disengaged from the respective third portions 68b of the cancelers 69. When the casing 16 is further inserted, the projections 67e of the latch members 67 fall into the recesses 21 of the bank portion 20 to be fitted therein, respectively, as shown in FIG. 16B. In this state, the retaining frame 17 is held by the holding device 35. The force of insertion of the casing 16 to cause the retaining frame 17 to be held by the holding device 35 may be extremely small, since it should be only just large enough to rock the latch members 67 along the slant faces 67c against the urging force of the second springs 72b. While the retaining frame 17 is held by the holding device 35, the respective second portions 67b of the latch members 67 are separated from the respective third portions 68b of the cancelers 69.

At the same time with the aforesaid unlocking action, moreover, the pin 78 of the transverse guide member 77 is inserted into one of the guide grooves 60 at the bank portion 20. Accordingly, the transverse position of the retaining frame 17 is regulated with improved accuracy, as compared with the case of the prior art apparatus.

Figure 16C:
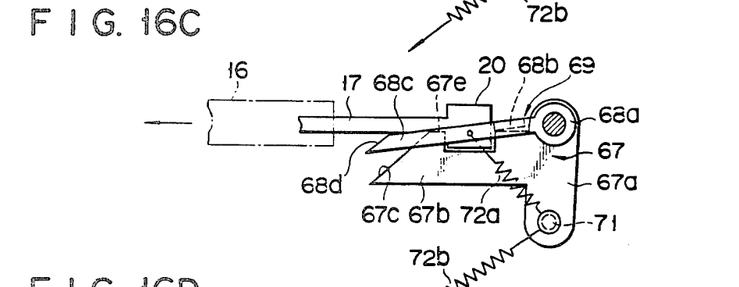

Thus, when the casing 16 is drawn out under the condition of the retaining frame 17 unlocked therefrom and held by the holding device 35, the retaining frame 17 and the video disk 15 are left in the housing 12, and the casing 16 alone is taken out, as shown in FIG. 16C. In the state where only the casing 16 is outside the housing 12, the fourth portions 68c of the cancelers 69 are free from the projected portions 191, 192, respectively, so that the cancelers 69 are rocked by the urging force of the first springs 72a until their third portions 68b abut against the second portions 67b of the latch members 67. While the third portions 68b are in contact with the second portions 67b, the slant faces 68d formed at the distal ends of the third portions 68b are allowed to engage the lower edge of the casing 16.

Figure 16D:
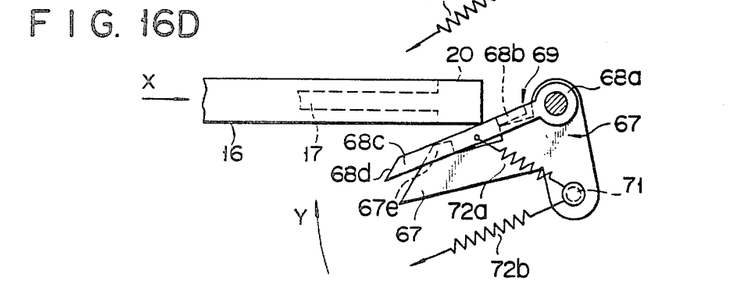

While the video disk 15 is thus set in the housing 12, the reproducing operation is performed in the aforementioned manner. When the reproducing operation is ended, the empty casing 16 is inserted again into the housing 12 through the insertion slot 14 for taking out the video disk 15 with the retaining frame 17 from the player 10. The inserted casing 16 is regulated roughly in transverse position by the spring strips 61, and is regulated precisely in vertical and transverse positions by the vertical and transverse guide members 76 and 77. Then, the casing 16 reaches the innermost part of the housing 12 to abut against the strips 631 and 632, when the insertion is completed. As the casing 16 is inserted in the vicinity of the innermost part of the housing 12, the lower edge of the casing 16 abuts against the slant faces 68d of the respective fourth portions 68c of the cancelers 69, thereby rotating the cancelers 69 in the opposite direction of the arrow Y along the slant faces 68d against the urging force of the second springs 72b. Hereupon, the third portions 68b of the cancelers 69 engage the top surfaces of the second portions 67b of the latch members 67, respectively, so that the latch members 67 rock together with the cancelers 69. The united rotation of the latch members 67 and the cancelers 69 continues until the lower edge of the casing 16 comes into slide contact with the top surfaces of the fourth portions 68c of the cancelers 69, and finally, the projections 67e of the latch members 67 are disengaged from the recesses 21 of the retaining frame 17, as shown in FIG. 16D. In other words, the retaining frame 17 is released from the holding device 35.

On completion of the insertion of the casing 16 in the housing 12, the retaining frame 17 and the video disk 15 are entirely housed in the casing 16. When the insertion of the retaining frame 17 in the casing 16 is completed, the claws 25 of the retaining frame 17 are fitted in the stop notches 26 of the casing 16 to lock the retaining frame 17 to the casing 16.

After the insertion of the casing 16 is thus completed, and the retaining frame 17 is released from the holding device and locked to the casing 16, the casing 16, while containing therein the retaining frame 17 and the video disk 15, is forcibly pushed out of the housing 12 by the elastic force of the elastic strips 74. In this state, the latch members 67 and the cancelers 69 are returned to the position shown in FIG. 16A by the elastic force of the first and second springs 72a and 72b. Thus, a series of operations of the holding device 35 is completed. The slant faces 67c, 68d, 77c and 78a may be formed severally on the projected portions 191 and 192 of the casing 16 and the bank portion 20 of the retaining frame 17, instead of being formed on the latch members 67, release strips 68, transverse guide member 77 and pin 78, respectively.

According to the above-mentioned embodiment, the shaft device 65 has a double-shaft structure, and the pairs of latch members 67 and cancelers 69 are so designed as to rock in a body, respectively. When the casing 16 loading the retaining frame 17 and the video disk 15 is inserted, therefore, the holding device 35 unlocks the retaining frame 17 from the casing 16, and holds the retaining frame 17. When the empty or unloaded casing 16 is inserted after the reproducing operation is ended, on the other hand, the holding device 35 locks the retaining frame 17 to the casing 16, and releases its hold of the retaining frame 17. Thus, an error-free, reliable inserting operation can be achieved.

According to the embodiment, moreover, even if the inserted casing 16 has been broken, the holding device 35 will never bite into the broken casing 16 to prevent the removal thereof. This problem will now be described in detail.

Figure 17:
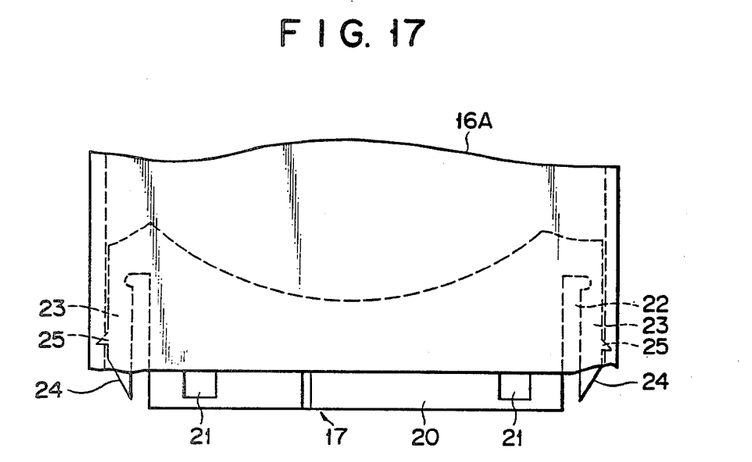
FIG. 17 is a plan view of a casing with both projected portions broken.
Figure 18:
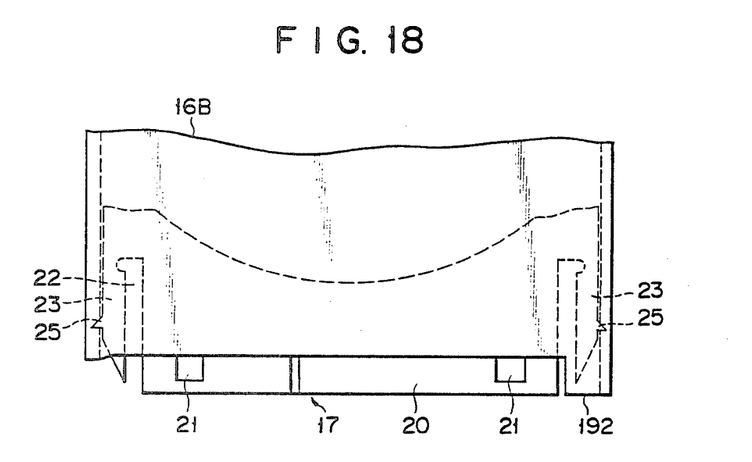
FIG. 18 is a plan view of a casing with one of its projected portions broken.

Generally, the casing is formed of plastics. If dropped or bumped against anything by mistake, therefore, the casing 16 may be broken. In particular, the projected portions 191 and 192 at both ends of the opening 19 of the casing 16 are very easy to break. FIGS. 17 and 18 show specific examples of the broken casing 16. FIG. 17 shows an example or casing 16a in which both of the projected portions 191 and 192 are broken, while FIG. 18 shows an example or casing 16b in which only one projected portion 191 is broken.

First, if the casing 16a with both projected portions 191 and 192 thereof broken, as shown in FIG. 17, is inserted in the housing 12, both the fourth portions 68c of the cancelers 69, which act as mentioned before in connection with FIG. 16A with the intact casing 16, rock downwardly (opposite to the direction of the arrow Y) with the latch members 67, since the projected portions 191 and 192 to guide the fourth portions 68c to engage the slant faces 24 of the elastic strips 23 are removed. Accordingly, the cancelers 69 do not move the elastic strips 23 inwardly, and do not cause the claws 25 to be disengaged from the stop notches 26. Once rocked downwardly, the cancelers 69 are further rocked downwardly through the engagement between the top surfaces of their fourth portions 68c and the lower edge of the broken casing 16a, so that the latch members 67 are not kept from engaging the bank portion 20 of the retaining frame 17. Thus, the operating state is switched directly from the state shown in FIG. 16A to the state shown in FIG. 16D. 16a, both the retaining frame 17 and the video disk 15 are taken out of the housing 12 while they are kept in the casing 16a. Thus, even though the casing 16 with both of its projected portions 191 and 192 broken is used, the holding device 35 neither bites into nor holds the retaining frame 17 or the casing 16a. Seeing this, an operator will notice the necessity of replacement of the casing 16a.

On the other hand, if the casing 16b with only the one projected portion 191 thereof broken, as shown in FIG. 18, is used, the aforesaid bite is conventionally a serious problem. Conventionally, a holding device for holding the casing 16 and the retaining frame 17 with the aforementioned constructions is provided with a shaft device of a one-shaft structure. This shaft device includes a single shaft portion, and a pair of cancelers are independently rockably attached to both ends of the shaft portion, severally. If the casing 16b shown in FIG. 18 is inserted into a housing with the conventional holding device of such construction, the other engagement between the claw 25 of the retaining frame 17 and the stop notch 26 of the casing 16b is released by the other canceler 69 on that side of the casing 16b where the other projected portion 192 exists. At the same time, the retaining frame 17 is held by both latch members 67 of the holding device 35. On that side of the casing 16b where one projected portion 191 is broken, however, the fourth portion 68c of one canceler 69 independently rocks downwardly with the other latch member 67, since the projected portion 191 to guide the fourth portion 68c to engage the slant face 24 of one elastic strip 23 is removed. Accordingly, the one canceler 69 does not move the one elastic strip 23 inwardly, and does not cause one claw 25 to be disengaged from its corresponding one stop notch 26. Thus, in the prior art holding device, the retaining frame 17 and the casing 16b are not released from the locked state on one side of the casing 16b, whereas, on the other side, the retaining frame 17 is held by the holding device, which bites into the casing 16b as mentioned before. As a result, it becomes impossible to draw out the casing 16b from the housing 12. In case of such bite, if you try to pull out the casing 16b by force, the holding device 35 or the casing 16b or the retaining frame 17 will possibly be damaged and rendered unusable. If such bite occurs, therefore, the housing 12 need be divided into pieces to expose its interior so that the engagement between the claw 25 of the elastic strip 23 and the stop notch 26 of the casing 16 may be forcibly released by a separate member. It is impossible for a general user and requires the skill of an expert to deal with such trouble. Thus, you will not be able to enjoy prolonged use of the video disk, and besides, will have to meet increased expenses.

According to the above-mentioned embodiment, however, the shaft device 65 has a double-shaft structure, so that even if the broken casing 16b as shown in FIG. 18 is used, the holding device 35 will never bite into the casing 16b. Now there will be described in detail the operation of the holding device 35 of the embodiment in the case where the broken casing 16b is used.

If the broken casing 16b as shown in FIG. 18 is inserted into the housing 12, the other engagement between the other claw 25 of the retaining frame 17 and the other stop notch 26 of the casing 16 is released by the other canceler 69, as shown in FIGS. 16A to 16D, on the other side of the casing 16b where the projected portion 192 exists, and the retaining frame 17 is held on the holding device 35 by both latch members 67. On the side of the broken projected portion 191, one canceler 69 is so designed as to rotate in a body with the other canceler 69 about the second shaft 662. As for the second shaft 662, it is allowed by the first shaft 661 to rock freely. Accordingly, when the fourth portion 68c of the other canceler 69 is inserted into the projected portion 192, the other canceler 69 is fixed where it is, and likewise, the one canceler 69 is fixed as it is and disabled to rotate. Thus, despite the absence of the projected portion 191, one canceler 69 abuts against its corresponding elastic strip 23 of the retaining frame 17, and the elastic strip 23 is biased inwardly to cause its corresponding claw 25 of the retaining frame 17 to be disengaged from the stop notch 26 of the casing 16b. Accordingly, the casing 16b can be drawn out of the housing 12 while the retaining frame 17 and the video disc 15 are left within the housing 12.

Thus, even though one projected portion 191 of the inserted casing 16b is broken, the casing 16b can be inserted in the same manner as the normal casing 16, and can hence be drawn out of the housing 12 without hindrance.

According to one embodiment of the present invention, as described in detail herein, the holding device 35 is provided with the shaft device 65 of a double-shaft structure, so that the player 10 is greatly simplified in construction as compared with the prior art player. Further, the resistance at the insertion of the casing is reduced, the accuracy of the location of the casing is much improved, and thus the holding operation is made error-free and greatly improved in reliability.

What is claimed is:

1. An apparatus for holding a disk which is kept in a casing at all times except when being played, the disk being surrounded by a retaining frame which serves to move the disk into and out of the casing when the disk is inserted into and drawn from the apparatus, said casing providing lock means for locking the retaining frame thereto, said lock means including a stop notch formed on each inner side face of the casing, and a strip formed on each outer side face of the retaining frame and having a claw in a position to engage each said stop notch corresponding thereto, said claw being capable of being disengaged from its corresponding stop notch, said apparatus comprising:
 a housing;
 latch means, rotatably disposed in said housing about an axis, for locking said retaining frame to said housing when said casing with said disk is inserted into said housing;
 cancel means, rotatably disposed in the housing about the same axis as said latch member, for unlocking said retaining frame from said casing when said casing with said disk is inserted into said housing, said cancel means having a portion connected thereto for rotating said latch means to unlock said retaining frame from said housing when said casing without said retaining frame and said disk is inserted into said housing; and
 urging means for urging said latch means to rock from a position where said latch means does not hold said retaining frame when said casing without said retaining frame and said disk is inserted into said housing, to a position where said latch member engages said retaining frame when said casing with said retaining frame and said disk is inserted.

2. The apparatus according to claim 1, wherein said latch means includes a pair of latch members and said urging means includes a pair of urging members, each disposed between one of said latch members and said housing, respectively.

3. The apparatus according to claim 1, which further comprises another urging means for urging said latch means and said cancel means so that a top surface of said latch means engages said rotating portion of said cancel means.

4. The apparatus according the claim 3, wherein said latch means includes a pair of latch members and said cancel means includes a pair of cancel members and said another urging means includes another pair of urging members, each disposed between one of said latch members and one of said cancel members, respectively.

5. The apparatus according to claim 1, which further comprises position regulating means, disposed in said housing, for engaging said cancel means and locating said cancel means to unlock said retaining means from said casing when said regulating means is in contact with said cancel means.

6. The apparatus according to claim 5, wherein said housing includes a chassis therein and said position regulating means includes a pair of strips attached to said chassis and disposed to engage said cancel means.

7. The apparatus according to claim 1, further comprising:
 a first shaft rotatably attached to said housing and connected to said latch means; and
 a second shaft rotatable with respect to and coaxial with said first shaft and connected to said cancel means.

* * * * *